Jan. 21, 1958 R. EMANUEL 2,820,557
TRAVELLING CRANE
Filed Dec. 1, 1955 2 Sheets-Sheet 2

United States Patent Office 2,820,557
Patented Jan. 21, 1958

2,820,557

TRAVELLING CRANE

Roberto Emanuel, Turin, Italy, assignor to Emanuel Di Giuseppe E., Roberto Emanuel & C. Società in Accomandita Semplice, Turin, Italy Application December 1, 1955, Serial No. 550,434

Claims priority, application Italy December 2, 1954

2 Claims. (Cl. 214—394)

This invention relates to a travelling crane adapted more particularly, but not exclusively for lifting and transporting aircraft which, owing to damage to the landing gear, are uncapable of self-propulsion nor of being hauled by tractors or the like.

The problem of lifting damaged aircraft constantly involved considerable difficulties which were met with by emergency provisions, such as a larger number of attendants, without avoiding further damage to the aircraft. Moreover, owing to the lack of suitable equipment, the removal from a runway of aircraft which, having suffered slight damage to the landing gear, paralyse operation of the runway by preventing take-off or landing of other aircraft, still has to be effected at present by primitive means which cause further damage to the structure and make necessary the removal of large structural parts from the aircraft. Even the use of cranes with a cantilever jib is limited to moderate loads, the ratio between the crane dead weight and weight of the load to be lifted being not less than 3:1.

This invention provides a crane which is adapted to advantageously solve this complex problem, the ratio between the crane dead weight to the weight to be lifted being brought to 1:2 and more.

A further object of this invention is to provide a travelling crane which can be readily moved to its operating position and is provided with means by which the damaged aircraft is easily slung.

The crane according to this invention is easily adapted to lift and convey heavy material other than aircraft, such as railway or tramway cars, electric cables in reel form, or to lift heavy weight from wells, channels or the like.

The crane according to the present invention comprises a single-axled tractor vehicle having a pair of road wheels, an upstanding king-pin member on the tractor vehicle, a rigid load-supporting structure including two substantially parallel beams and a transverse bracing member connecting the beams to form the said rigid structure, a pivotal connection between the front ends of said beams and the king-pin on the tractor vehicle, a road wheel supporting opposite ends of each beam from the ground, means including an upstanding leg connecting the wheel and the associated beam for a longitudinal movement with respect to the beam, a vertically extensible leg for each beam depending from an intermediate section of its associated beam, a wheel supported from a lower portion of the extensible leg, and a load lifting and supporting means supported from the said rigid structure.

Further characteristic features and advantages of this invention will be understood from the appended description referring to the accompanying drawings, which are given by way of a non-limiting example, wherein.

Figure 1:
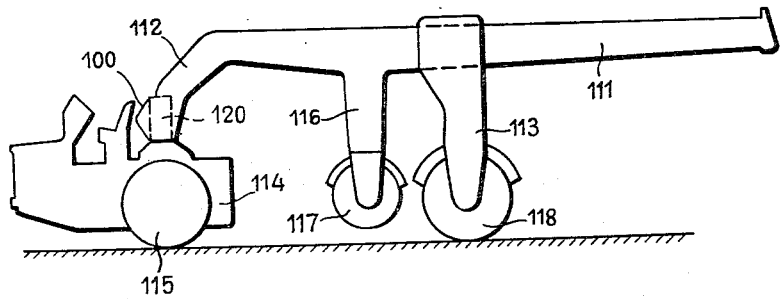
Figs. 1, 2 and 3 show an aircraft lifting crane according to this invention in its various successive operation positions.

In the drawing, a single-axled tractor vehicle 114 is shown, having a pair of coaxial road wheels, 115, 115. An upstanding king-pin member 120 is supported from the vehicle body with its vertical axis intersecting the common axis of the wheels 115, 115.

A rigid load-supporting structure is pivotally connected to the kin-pin member 120, the structure comprising a pair of parallel substantially horizontal beams 111, 111, and a transverse bracing member 127 connecting the beams 111, 111, converge towards each other and are rigid with a hub-like section 100 rotatably receiving the king-pin member 120.

An upstanding leg 113 is slidable along each of the beams, a road wheel 118 being fitted to the lower end portion of the leg 113, whereby the rear end section of each beam may be supported from the ground, and whereby a self-powered traveling structure is formed including the tractor vehicle 114 with its road wheels 115, 115. Advantageously a transverse bracing member 128 is provided rigidly connecting the legs 113, 113 for a simultaneous displacement of the latter along the beams 111, 111, a further transverse bracing member 119 being rigidly fixed to the extreme rear end portions of the beams 111, 111, thereby to ultimately rigidify the structure.

Figure 2:
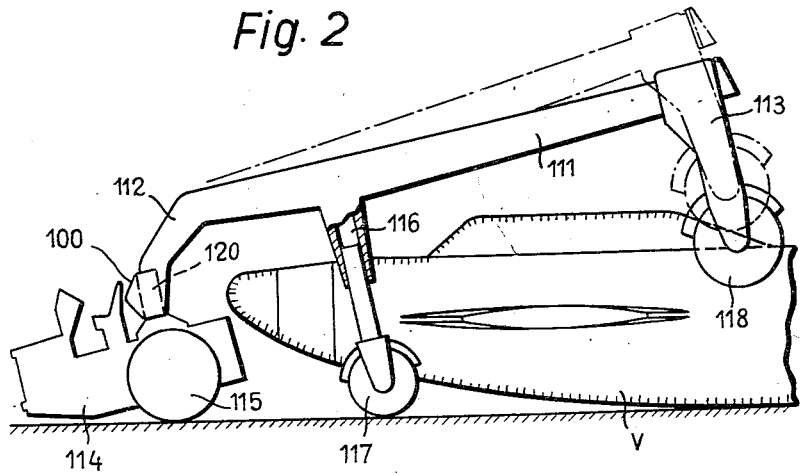
Figure 3:
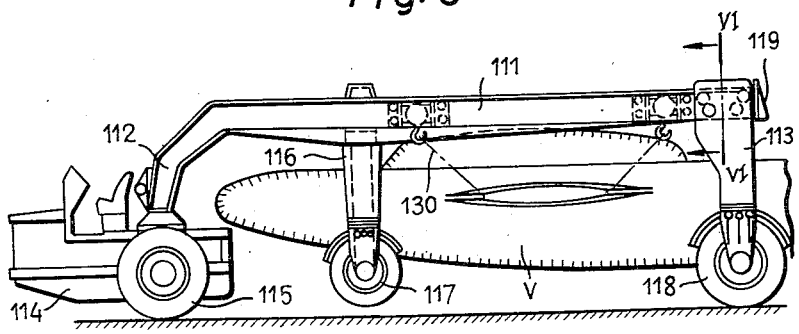

Depending from an intermediate section of each beam 111 a vertically extensible leg 116 is fitted to the beam, the said leg comprising two telescopically interconnected sections and a wheel 117 fitted to the lower section, schematically shown in Fig. 2. It is immaterial for this invention what kind of means is employed to operate the extensible legs 116, although I prefer to design each of the legs as a double-acting hydraulic cylinder, whereby the leg may be extended to the position shown in Fig. 2, and, alternatively, brought to its reentered condition, as shown in Figs. 1 and 3, wherein the wheel 117 is lifted off the ground. It is to be understood that suitable means (not shown) are provided to control the legs 116, 116.

Figure 6:
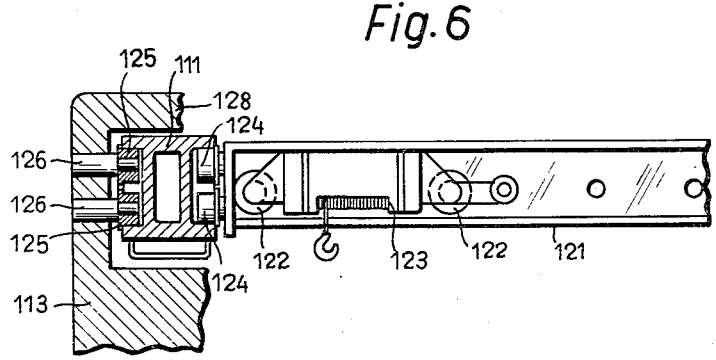
Fig. 6 is a cross-sectional detail view on line VI—VI of Fig. 3.

As shown in Fig. 6, the leg 113 actually rolls lengthwise of its associated beam 111, pivots 126 carrying rollers 125 being fitted to this end of the leg. As is further shown in Fig. 6, similar rolling connection is employed for the load lifting means of the crane, the said means comprising pairs of transverse girders 121 having rollers 124 fitted on their end portions in rolling engagement with the beams 111, 111, and a wheeled hoist such as 123, which is supported from the girders 121 through wheels 122, whereby the hoist may be displaced at will transversely of the crane, and whereby the girders 121 may be displaced at will lengthwise of the crane. Conveniently, as shown, the beams 111 are of a double-T cross sectional shape, with the rollers 124, 125 engaging the inner sides of the lateral channels of the double-T, respectively.

Figure 4:
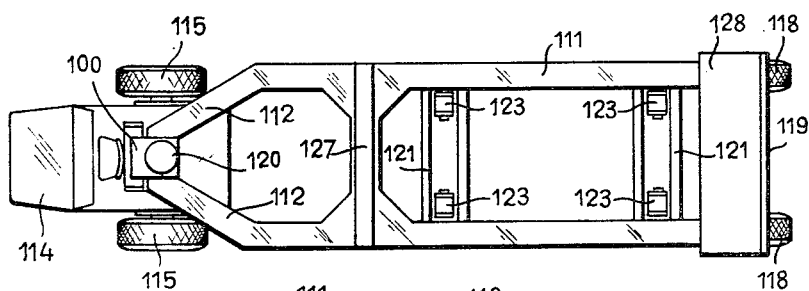
Fig. 4 is a plan view of Fig. 3.
Figure 5:
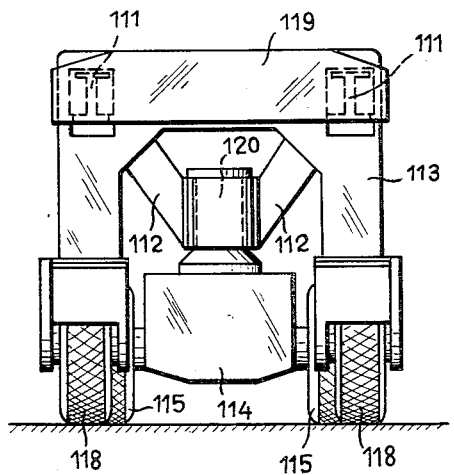
Fig. 5 is an end view of Fig. 3 on an enlarged scale.

In the inoperative condition of the crane, as shown in Fig. 1, the extensible legs 116 are reentered, with the wheels 117 lifted off the ground, while the legs 113 are advantageously displaced close to the legs 116, thereby to shorten the rolling length of the crane and facilitate its maneuverability. In order to seize an aircraft, indicated at V in the drawings, the legs 113 are displaced backwardly and the legs 116 telescopically extended to incline the beams 111 and lift the legs 113 and wheels 118 up to a height such as to admit the aircraft wings therethrough. The crane is then moved backwardly to place the beams 111 at both sides of the fuselage of the aircraft and bring the legs 113 beyond the aircraft wings, as shown in Fig. 2. Finally, the extensible legs 116 are telescopically withdrawn from the ground-engaging condition and the aircraft is lifted by means of hoisting devices 123, provided suitable hammocks, indicated at 130, are placed beneath the aircraft wings and anchored to the hoists (Fig. 3). As may be seen more advantageously in Fig. 4, there are four hoists 123 on the crane.

What I claim is:

1. A traveling crane comprising a single-axled tractor vehicle having a pair of road wheels, an up-standing king-pin member on the tractor vehicle, a rigid-load-supporting structure including two substantially parallel beams to form the said rigid structure, a pivotal connection between the front ends of the said beams and the king-pin on the tractor vehicle, a road wheel supporting opposite ends of each beam from the ground, means including an upstanding leg connecting the wheel and the associated beam for a longitudinal movement with respect to the beam, a vertically extensible leg for each beam depending from an intermediate section of its associated beam, a wheel supported from a lower portion of the extensible leg, and a load lifting and supporting means supported from said rigid structure.

2. In a traveling crane as claimed in claim 1, a transverse bracing member rigidly connecting the said upstanding legs for a simultaneous displacement along the beams.

References Cited in the file of this patent

UNITED STATES PATENTS

| | | | |
|---|---|---|---|
| Re. 22,914 | Ballinger | | Sept. 16, 1947 |
| 1,790,692 | Allen | | Feb. 3, 1931 |
| 2,589,948 | Marshall | | Mar. 18, 1952 |
| 2,606,001 | Lepper | | Aug. 5, 1952 |
| 2,680,525 | Weatherby | | June 8, 1954 |